United States Patent [19]

Wofford et al.

[11] Patent Number: 5,750,823

[45] Date of Patent: May 12, 1998

[54] PROCESS AND DEVICE FOR DESTRUCTION OF HALOHYDROCARBONS

[75] Inventors: Bill Wofford, Little Rock, Ark.; Marc Jackson, Seabrook; John Bevan, College Station, both of Tex.

[73] Assignee: R.F. Environmental Systems, Inc., Seabrook, Tex.

[21] Appl. No.: 499,973

[22] Filed: Jul. 10, 1995

[51] Int. Cl.⁶ ........................................ A62D 3/00
[52] U.S. Cl. .................. 588/210; 588/205; 588/211; 588/212; 423/210
[58] Field of Search ........................ 588/205, 210, 588/211, 212; 110/235; 204/157.3; 210/748; 423/210

[56] References Cited

U.S. PATENT DOCUMENTS

| | | | |
|---|---|---|---|
| 4,345,983 | 8/1982 | Wan | 204/158 |
| 4,438,706 | 3/1984 | Boday et al. | 110/238 |
| 4,509,434 | 4/1985 | Boday et al. | 110/346 |
| 4,582,004 | 4/1986 | Fey et al. | 110/346 |
| 4,615,285 | 10/1986 | Bentell et al. | 110/346 |
| 4,644,877 | 2/1987 | Barton et al. | 110/250 |
| 4,950,309 | 8/1990 | Schulz | 48/197 |
| 5,078,823 | 1/1992 | Chollet et al. | 156/345 |
| 5,100,638 | 3/1992 | Levin | 423/469 |
| 5,137,701 | 8/1992 | Mundt | 423/210 |
| 5,187,344 | 2/1993 | Mizuno et al. | 219/121 |
| 5,238,665 | 8/1993 | Lerner | 423/240 |
| 5,245,112 | 9/1993 | Hoshimoto et al. | 423/245.2 |
| 5,300,202 | 4/1994 | Moegel | 204/157 |
| 5,310,461 | 5/1994 | Bardelli et al. | 204/164 |
| 5,340,450 | 8/1994 | Griffiths et al. | 204/157.3 |
| 5,354,962 | 10/1994 | Mizuno et al. | 219/121 |
| 5,363,781 | 11/1994 | Chang et al. | |

FOREIGN PATENT DOCUMENTS

602510A1  6/1994  European Pat. Off.

*Primary Examiner*—Deborah Jones
*Assistant Examiner*—Amy M. Harding
*Attorney, Agent, or Firm*—David W. Carstens; Strasburger & Price

[57] ABSTRACT

A waste gas stream including halohydrocarbons is treated with a surface wave to form a cold plasma. Additional reaction gases can be mixed with the waste gas stream to improve the destruction of the halohydrocarbons. The apparatus for the treatment of gaseous halogenated organic and other persistent organic compounds includes a reaction vessel (12) in which the waste gas is exposed to the surface wave, thereby forming a non-thermal plasma. The apparatus further includes a means for mixing (7) the waste gases together with the appropriate ancillary reaction gases to facilitate formation of free radicals suited to treat a particular waste stream. Also, a means of introducing an appropriate mixture of waste gases and additive gases into the plasma reaction vessel where the halohydrocarbons are decomposed is provided. Since some reactions may produce solid material by-products that are not easily handled by suction pumps a means of trapping (13) these particles may be included in this apparatus.

12 Claims, 5 Drawing Sheets

PROCESS AND DEVICE FOR DESTRUCTION OF HALOHYDROCARBONS

FIELD OF THE INVENTION

This invention relates to a process and a device for destruction of halohydrocarbons and other persistent organic compounds. Specifically, the process is suited for organic compounds found in low pressure waste streams produced during semiconductor etching and deposition processes, and in the use of the process in near atmospheric pressure remedial waste streams such as those found emanating from soil vapor extraction and ground water pump and treatment systems.

BACKGROUND OF THE INVENTION

The semiconductor fabrication industry incorporates numerous low pressure operations during the manufacturing of semiconductor wafers such as chemical etch, plasma assisted metal deposition, and the like. Gaseous waste streams emanating from these processes contain halogenated organic chemicals which are both hazardous to human health and to the environment. Typically these waste streams are diluted with air and are subsequently thermally incinerated. However, due to the thermal stability of many of these halohydrocarbons such as hexafluoroethane ($C_2F_6$) and tetrafluoromethane ($CF_4$), sometimes referred to as perflourocomponds, this incineration process is not completely effective, and thus, some of these environmentally harmful compounds are emitted into the atmosphere. Another disadvantage of the current method is that the waste streams from numerous tool sets are combined into a single waste stream prior to incineration. This leads to numerous inefficiencies, because the incinerator must be constantly operated at parameters that give the best results for the bulk flow and not tuned to each individual stream. This also complicates the ability to adequately account for total operation costs on a per tool basis which is the preferred method today.

Although thermal incineration is widely accepted as the decomposition technique of choice, other techniques are known and have been reported to be useful in the control or abatement of halohydrocarbons. One such method is adsorption of these organic wastes onto activated carbon. This system works by trapping the contaminates to prevent their release into the atmosphere, but this process does not solve the basic question of ultimate disposal. Activated carbon units must be regenerated periodically, and the "trapped" organic must still be disposed of by thermal incineration by similar means. Another disadvantage is the high labor cost associated with replacing carbon units once breakthrough occurs.

One other general group of methods is based on a plasma process which include atmospheric pressure corona discharge systems, thermal plasma torch processes, reduced pressure glow discharge processes and discharge beam processes. Most of these techniques are considered to be thermal plasmas and achieve their destruction efficiencies by generating temperatures as high as 10,000° C. in order to dissociate by pyrolysis almost all molecules into atoms and/or ions. Deficiencies, however, like short operating lifetimes of electrodes and large power consumption requirements limit the viability of these known systems.

In contrast to thermal plasmas, non-thermal (cold) plasmas are generated under non-thermodynamic conditions such that effective electron temperatures of over 10,000° C. are achieved while the bulk gas temperature remains much closer to ambient temperature. Such high electron temperatures are generated by accelerating electrons through an imposed high frequency electromagnetic field where they transfer their energy through elastic and inelastic collisions with neutral molecules. This mechanism advantageously transmits input energy into the formation of ions and free radicals without adding the enthalpy for the bulk heating of the gas. Better coupling of input energy to destruction mechanisms allows for reduced energy requirements and the associated expense. The subsequent generation of highly reactive free radicals such as OH, $CH_3$, and O efficiently scavenge halohydrocarbons to produce such innocuous by-products as carbon dioxide and water and/or other easily scrubbed and neutralized products such as hydrogen fluoride.

One limitation of many high frequency plasma discharges is that they are confined and maintained by the dimensions of the generating source such as between metal electrodes, in resonant cavities or within coils. More recently, however, discharges sustained by surface waves have been developed. Surface wave discharges are a type of traveling wave discharge and the plasma formed is sustained by the propagation of an electromagnetic wave traveling in a cylindrical dielectric tube. The traveling waves appear to be attached to the boundary dielectric and are able to propagate even if the plasma vessel is curved or is tapered. Also, the length of the plasma discharge may be many times longer than the tube radius.

SUMMARY OF THE INVENTION

It is the object of the present invention to provide an apparatus and method for the removal of halogenated hydrocarbons and other persistent organic compounds from wastes streams in a safe and economical manner.

It is another object of the present invention to provide a new and useful apparatus and method for the destruction of halohydrocarbons, such as hexafluoroethane, by reaction facilitated by a non-thermal plasma.

Yet another object of the present invention is to provide an apparatus and method for gas waste treatment by the use of a non-thermal plasma generated by a high frequency (HF) surface wave discharge and the breaking of chemical bonds mainly through collisions with free radicals formed within the plasma.

It is a further object of the invention to provide an apparatus and method that are suitable for processing waste streams emanating from an individual semiconductor process tool and that can become an integral part of the individual tool.

It is a further object of the invention to provide and apparatus and method that are suitable for processing waste streams emanating from soil vapor extraction and ground water pump and treatment remediation systems.

The present invention comprises an apparatus for the treatment of gaseous halogenated organic and other persistent organic compounds. The apparatus includes a non-thermal plasma generated by a surface wave discharge as the means for generating free radicals in a cylindrical dielectric reaction vessel. The apparatus further includes a means for mixing the waste gases together with the appropriate ancillary reaction gases to facilitate formation of free radicals suited to treat a particular waste stream. Also, a means of introducing an appropriate mixture of waste gases and additive gases into the plasma reaction vessel where the halohydrocarbons are decomposed is provided. Since some reactions may produce solid material by-products that are not easily handled by suction pumps a means of trapping these particles may be included in this apparatus. Additionally, a means is provided for handling corrosive gaseous by-products by the use of a scrubber.

The reaction vessel is made of an insulating dielectric material such as quartz or a ceramic material. Since a portion of the microwave energy is converted into heat, the tubular reaction vessel is, according to a preferred embodiment of the invention loaded with an external cooling gas, preferably air. The cooling gas is fed with excess pressure advantageously near the surface wave launcher. Another preferred method is to flow an appropriate recirculating cooling fluid through an external jacket surrounding the reaction vessel. One such fluid is dimethylpolysiloxane.

Suitable ancillary reaction gases include natural gas (mostly methane), hydrogen, ammonia, hydrogen peroxide, oxygen or mixtures thereof.

One advantage of the present invention is that it provides an apparatus and method for precisely controlling the introduction of a mixture of waste gases with a mixture of ancillary reaction gases such that subsequent introduction into the plasma reaction vessel yields the desired products.

An additional advantage of the present invention is that it provides an economical apparatus and method for the destruction of halogenated organic compounds contained in gaseous waste streams.

Another advantage of the present invention is that it provides an apparatus and method for the waste treatment of the undiluted off gases from individual semiconductor wafer fabrication tools. This invention is compact enough to be integrated into and attached directly to said individual wafer processing tool.

Another advantage of the present invention is that it provides an apparatus and method for the waste treatment of atmospheric air diluted off gases from soil vapor extraction systems.

Regarding the further characterizing of the procedure, we expound the following:

1) Two or more plasma reactors may be placed in parallel with each other. This preferred method allows for the processing of waste streams containing very high flow rates. The waste stream may be split into two or more channels, thus having the effect of decreasing the flow rate in a particular stream. The achievement of very high destruction efficiencies may require this reduction in flow rate through a particular plasma reaction vessel.

2) Two or more plasma reactors may be placed sequentially in-line with each other. This preferred method allows the introduction of additive gases to be done in steps and has the added advantage of providing a means of optimizing a particular destruction reaction. Application of this method results in higher destruction efficiencies and has the added advantage of producing a preferred by-product(s). An example of this would be the destruction of tetrafluoromethane ($CF_4$) where methane ($CH_4$) and/or natural gas is introduced into the waste stream just prior to the first plasma reactor in order to substitute hydrogen in place of fluorine. This reaction would yield compounds of the form $CH_xF_x$ which are less thermally stable and can then be subsequently destroyed in a second reactor after the addition of oxygen ($O_2$).

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE INVENTION

Figure 1:
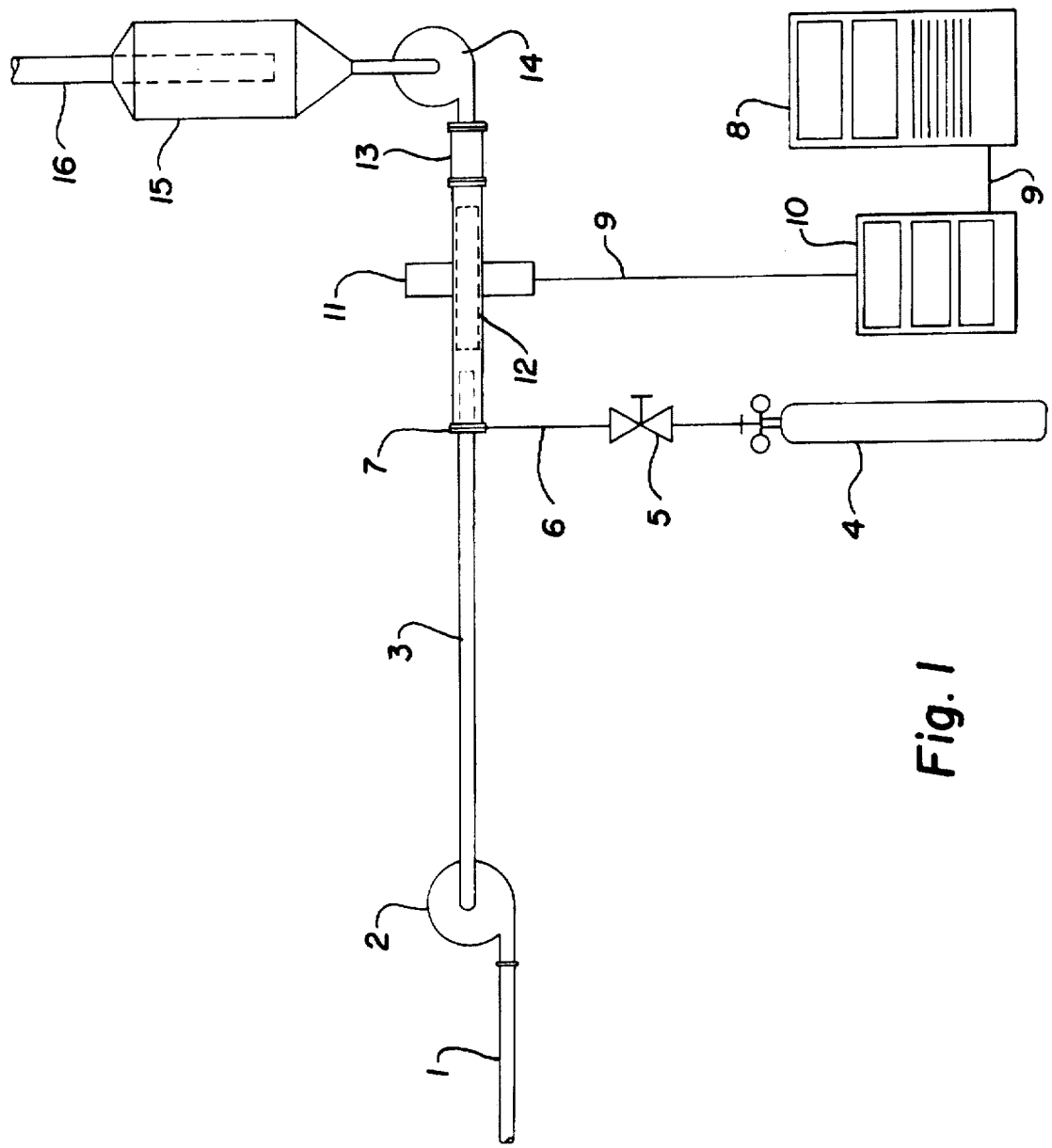
FIG. 1 is a schematic diagram of a system for destroying halohydrocarbons emitted from semiconductor processing equipment.

The present invention provides a method and apparatus for the destruction of halogenated hydrocarbons found in typical industrial processes. A preferred embodiment for which this invention is particularly adapted for use in the semiconductor industry where fabrication techniques include the low pressure processes of plasma etching and vapor deposition. FIG. 1 illustrates the components used in the system including a waste stream inlet pipeline 1, a suction pump 2, a connecting pipeline 3, an ancillary reaction gas source 4 with adjustable flow controller 5, a gas feed line 6, a back stream inhibitor/mixing vessel 7, a power generator 8, a feed line or waveguide 9, auxiliary elements 10, a surface wave launcher 11, a reaction vessel 12, a particulate filter device 13, a suction pump 14, a scrubber 15, and a vent stack 16.

Off gases from a semiconductor process tool are pumped out by the suction pump 2, such as a roots blower or a booster pump, and through the waste gas inlet 1 and travel through the connection pipeline 3 to the back stream inhibitor/mixing vessel 7 where one or more ancillary reaction gases are introduced into the process. Each ancillary gas source 4 will have its own adjustable flow controller 5. The choice of an ancillary reaction gas will depend upon the type of waste stream being processed and upon the targeted final product gases. For instance if the waste stream contains tetrafluoromethane ($CF_4$) and the targeted final product gases are carbon dioxide ($CO_2$) and hydrogen fluoride (HF) then appropriate ancillary reaction gases may be oxygen ($O_2$) and methane ($CH_4$). A balanced equation for this particular reaction is given by

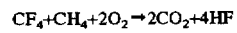

$$CF_4 + CH_4 + 2O_2 \rightarrow 2CO_2 + 4HF$$

A readily available source of methane is natural gas which on average is composed of roughly 82% methane with the remaining being ethane ($C_2H_6$) and propane ($C_3H_8$) and other alkanes and alkenes which would also be effective ancillary reaction gases.

The surface wave plasma source includes a power generator 8, a feed line or waveguide 9, auxiliary elements 10 and a surface wave launcher 11 and can be generated by a high frequency source such as microwave or radio frequency wave. The frequency of radiation chosen for generating the surface wave will determine the type of power generator 8, feed line 9, auxiliary elements 10, and launching device 11 employed for destruction of the waste stream. Suitable wave launching 11 device for the radio frequency region is a Ro-box and for the microwave region is either a Surfatron, a Surfaguide, or a Wave Guide-Surfatron. A preferred method incorporates a high frequency generator operating in the range of 1 MHz to 10 GHz, preferably at 2.45 GHz. A reaction vessel 12 which consists of an insulating dielectric material such as quartz or ceramic is perpendicularly placed inside the surface wave launcher 11. A means for trapping any particulate matter formed in the reaction vessel 12 is provided by the particulate filter device 13 such as an electrostatic precipitator or a cyclone filter. A suction pump 14, which could be either wet or dry, backs the first suction pump 2 and helps maintains the proper operational pressure. A scrubber 15 connected to the pressure side of the suction pump 14 removes and neutralizes any acid fumes that may be in the exhaust stream.

Figure 2:
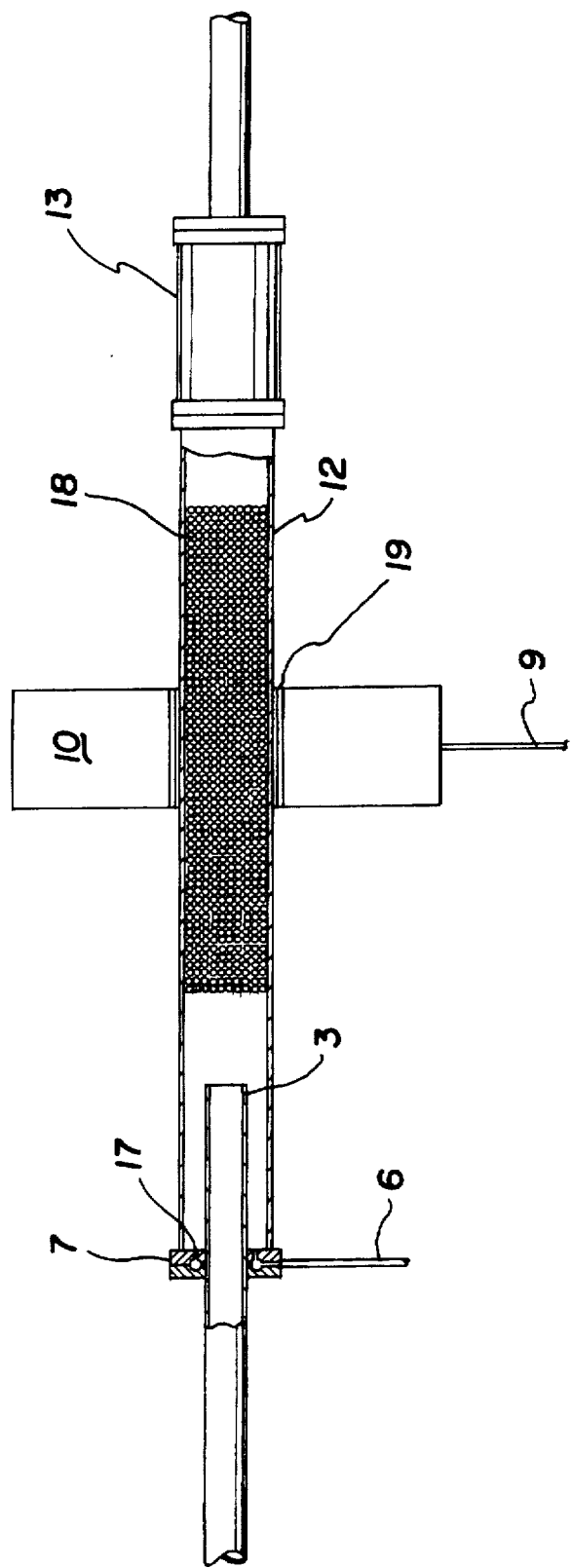
FIG. 2 is a detailed schematic diagram of a back stream inhibitor/mixing vessel and plasma reaction vessel.

The structure of the back stream inhibitor/mixing vessel 7 and the reaction vessel 12 are shown in greater detail in FIG. 2. As shown, the connecting pipeline 3 is a tube with an expanding tapered end that is inserted into the larger diameter back stream inhibitor/mixing vessel 7. Ancillary reaction gas inlets 17 may be added as shown to the front part of the mixing vessel. The length of the mixing vessel is optimized to minimize back streaming of gases into the waste gas inlet. The diameter of the mixing vessel may be between 10 mm to 100 mm and may be composed of any appropriate material. The reaction vessel 12 itself must be composed of dielectric material such as quartz or ceramic and may contain ceramic balls 18 distributed within the interior to facilitate destruction of the halohydrocarbons.

Figure 3:
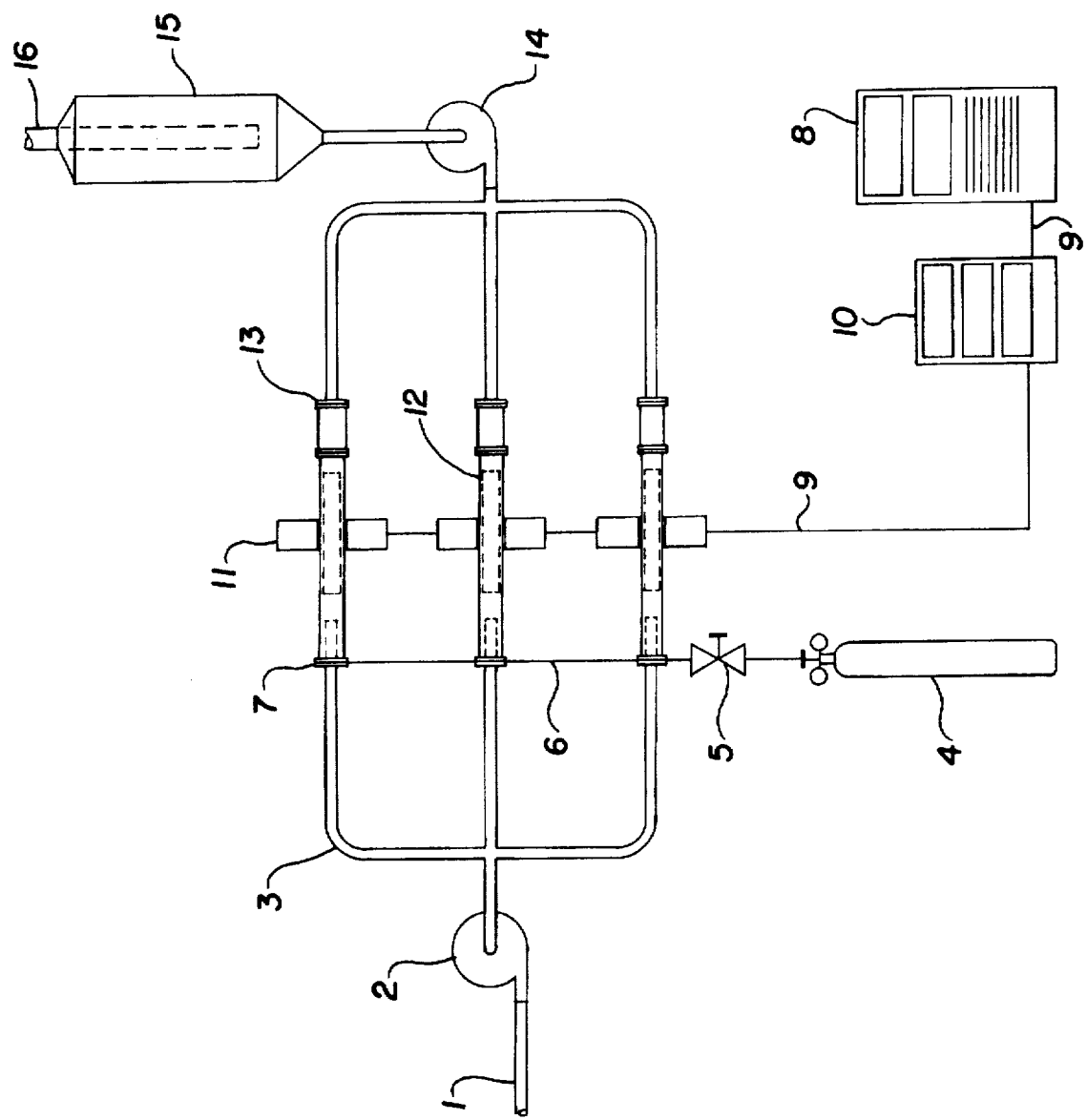
FIG. 3 is a schematic diagram of a system for destroying halohydrocarbons using multiple launching devices is parallel.
Figure 4:
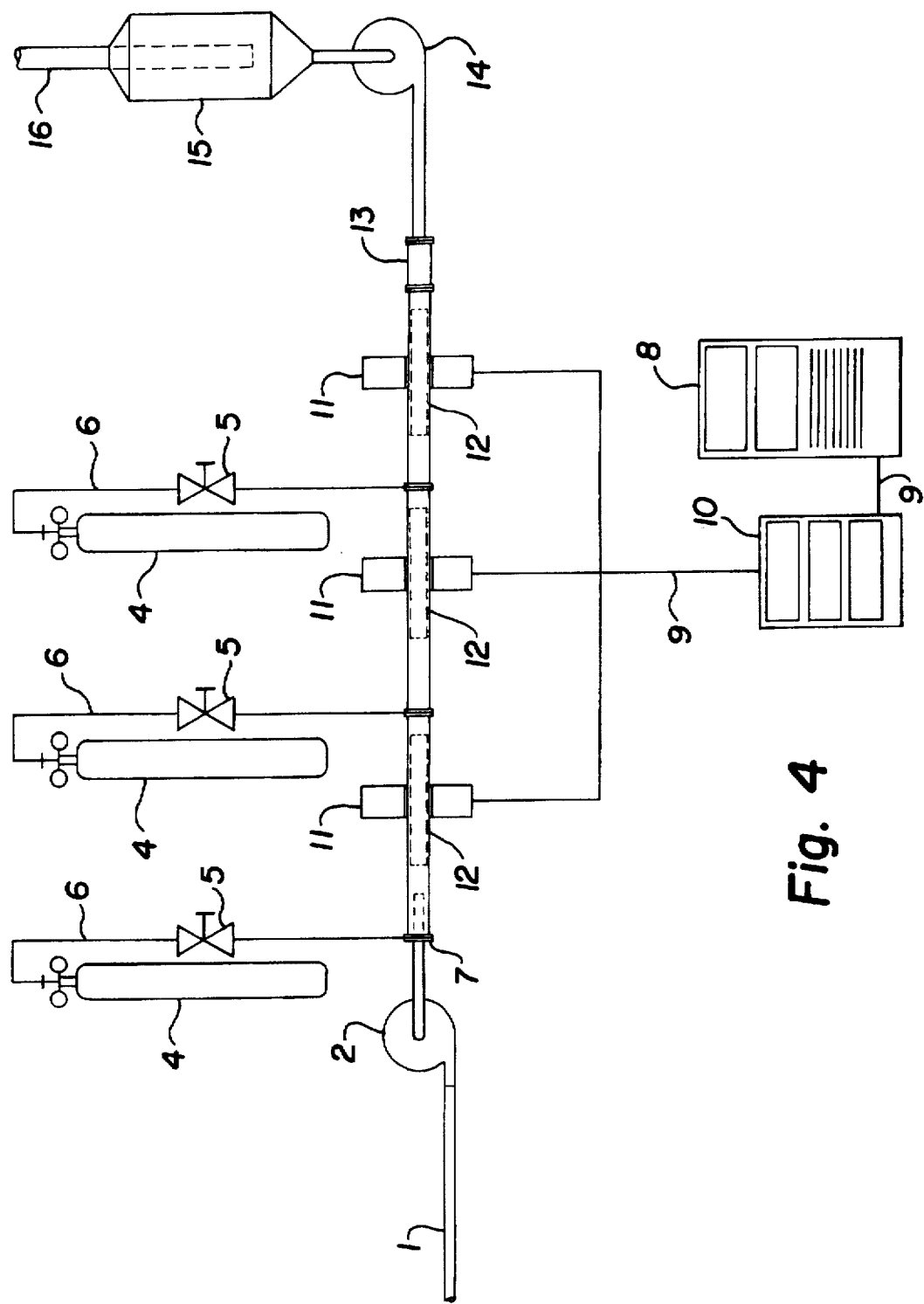
FIG. 4 is a schematic diagram of a system for destroying halohydrocarbons using multiple launching devices and auxiliary gas inlets in series.

FIG. 3 and FIG. 4 illustrate other preferred embodiments of the invention. The individual reaction vessel operates typically with a normal output in the range of 0.5 to 2.0 kW. In order to meet high output demands, several individual vessels may be united into one module. The disposal system with three reaction vessels exist in the exemplary embodiment illustrated in FIG. 3. The connecting pipelines 3 are attached to separate and distinct reaction vessels and are then re-connected to the same suction pump 14. This setup has the potential to triple waste gas throughput and may handle a corresponding increase in waste stream volume. FIG. 4 illustrates an exemplary system for destroying halohydrocarbons using three launching devices and auxiliary gas inlets in series. This embodiment contains a separate back stream inhibitor/mixing vessel 7 for each reaction vessel and allows additional control over free radical reactions. Such a setup may optimize the destruction of tetrafluoromethane ($CF_4$) without forming excess water as a by-product. For this case, methane ($CH_4$) and/or natural gas is introduced into the waste stream just prior to the first plasma reactor in order to substitute hydrogen in place of fluorine. This reaction would yield compounds of the form $CH_xF_x$ which are less thermally stable and can then be destroyed in a second reactor after the addition of oxygen ($O_2$). The figure illustrates a single power supply, but multiple power supplies have the ability to supply different amounts of power to each reaction vessel.

Figure 5:
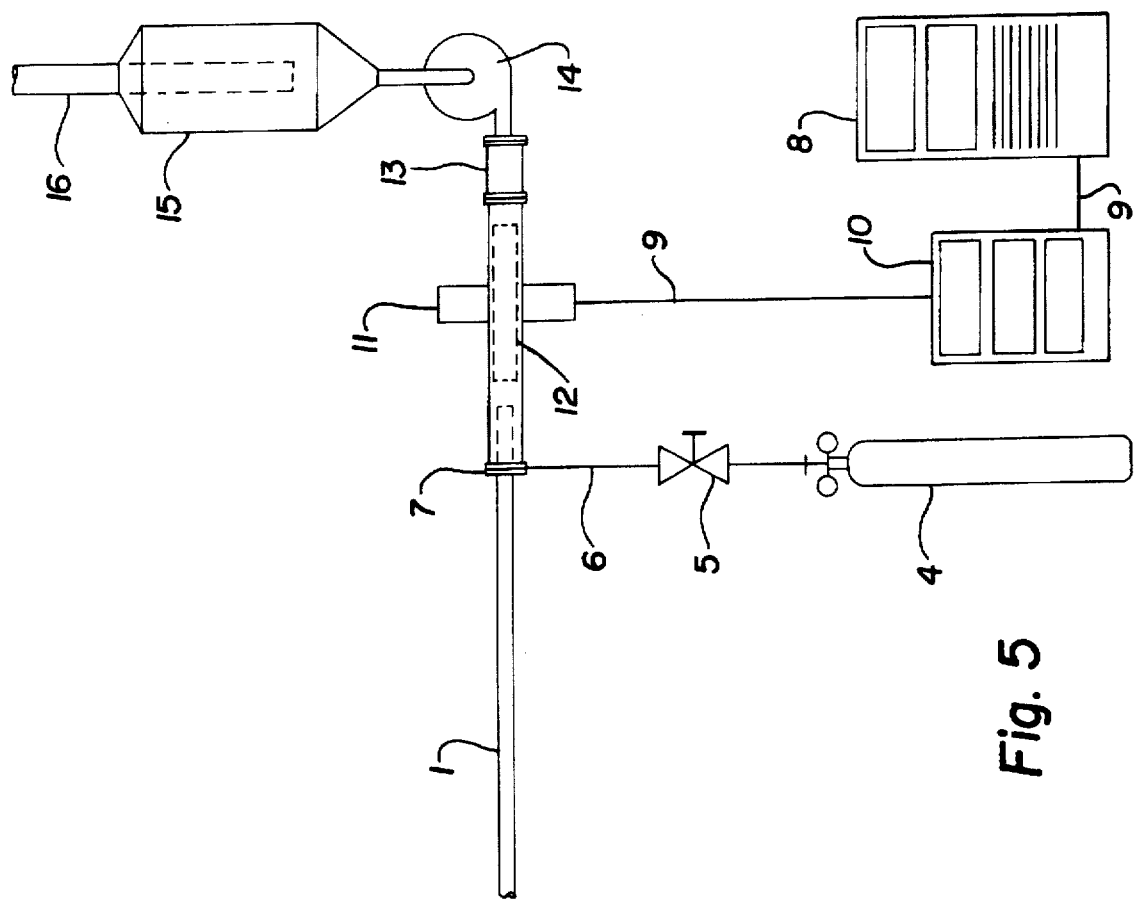
FIG. 5 is a schematic diagram of a system for destroying halohydrocarbons emitted from a soil vapor extraction remediation or any other source.

FIG. 5 illustrates another more general preferred embodiment of the invention in which waste streams other than the stated semiconductor stream are handled. Such waste streams include soil vapor extraction and ground water pump and treatment systems. This embodiment of the invention is very similar to that described in FIG. 1 and only differs in the absence of the first suction pump 2. Essentially the output streams from compatible waste generators entering the treatment system through the inlet pipeline 1 and is processed in a similar manner. This embodiment is the preferred embodiment for near atmospheric pressure waste streams.

Exemplary Embodiment

The first tests were carried out with a single surfaguide wave launcher design for microwave energy with a normal output of 500 watts and an operating frequency of 2.45 GHz. A surface wave discharge plasma was generated in a 2 inch diameter quartz reaction tube. A simulated waste gas stream containing carbontetrafluoride with a flow rate of 1 liter/min was mixed with natural gas and oxygen. Destruction efficiency of greater than 99.97% was achieved.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

We claim:

1. A method of destroying a halohydrocarbon comprising:
   (a) capturing a gaseous waste stream containing halohydrocarbons; and
   (b) destroying said stream by exposing said waste stream to a surface wave discharge to create a surface wave plasma whereby said halohydrocarbon is substantially converted to alternate chemical species.

2. The method of claim 1 further comprising mixing a reaction gas into the waste stream before exposing the waste stream.

3. A method of treating a waste stream containing a halogenated hydrocarbon, said method comprising:
   (a) feeding the waste stream into a mixing vessel;
   (b) mixing a reaction gas with the waste stream in the mixing vessel;
   (c) feeding the mixture of waste stream and reaction gas into a reaction vessel; and
   (d) creating a surface wave plasma in the reaction vessel whereby said halogenated hydrocarbon is substantially converted to alternate chemical species.

4. The method of claim 3 wherein said step of creating a surface wave plasma comprises the steps of subjecting the mixture to a surface wave discharge.

5. The method of claim 3 wherein the mixture is fed into a dielectric reaction vessel.

6. The method of claim 3 wherein the reaction vessel contains ceramic balls.

7. The method of claim 3 wherein said mixing vessel is said reaction vessel.

8. A method of treating a waste stream containing a perfluorocompound, said method comprising:
   (a) feeding the waste stream into a mixing vessel;
   (b) mixing a reaction gas with the waste stream in the mixing vessel;
   (c) feeding the mixture of waste stream and reaction gas into a reaction vessel; and
   (d) creating a surface wave plasma in the reaction vessel whereby said perfluorocompound is substantially converted to alternate chemical species.

9. The method of claim 8 wherein said step of creating a surface wave plasma comprises the steps of subjecting the mixture to a surface wave discharge.

10. The method of claim 8 wherein the mixture is fed into a dielectric reaction vessel.

11. The method of claim 8 wherein the reaction vessel contains ceramic balls.

12. The method of claim 8 wherein said mixing vessel is said reaction vessel.

* * * * *